United States Patent
Boylan

[15] 3,665,547
[45] May 30, 1972

[54] FILTER CLEANING DEVICE

[72] Inventor: John F. Boylan, Route 1 Box 81, Ulysses, Kans. 67880

[22] Filed: Aug. 27, 1970

[21] Appl. No.: 67,355

[52] U.S. Cl. ........................... 15/406, 134/37, 134/113, 134/166 R, 134/183
[51] Int. Cl. ........................................................... B08b 5/02
[58] Field of Search ............. 134/113, 102, 117, 136, 166 R, 134/166 C, 182, 183, 22 R, 22 C, 23, 24, 37; 15/304, 316, 406, 407

[56] References Cited

UNITED STATES PATENTS

| | | | |
|---|---|---|---|
| 2,450,308 | 9/1948 | Smith | 134/24 X |
| 2,669,217 | 2/1954 | Pearson | 134/24 X |
| 2,720,493 | 10/1955 | Fox | 134/22 R X |
| 3,044,475 | 7/1962 | Thompson | 15/304 X |
| 3,117,726 | 1/1964 | Schoberg | 134/37 X |
| 3,280,419 | 10/1966 | Frohlich | 15/406 |
| 3,566,892 | 3/1971 | Loque | 134/166 R X |
| 578,142 | 3/1897 | Fierz | 134/166 C X |
| 457,603 | 8/1891 | Fox | 134/182 X |
| 1,198,276 | 9/1916 | Rival et al. | 134/166 R |
| 3,216,429 | 11/1965 | Dick | 134/102 |

Primary Examiner—Robert L. Bleutge
Attorney—Fishburn, Gold and Litman

[57] ABSTRACT

A filter cleaning device for cleaning filters of porous material employed as air cleaners includes a pressure tank adapted to contain gaseous fluid under pressure and a flow conduit communicating with the tank and extending therefrom and having a baffle or shield mounted on the flow conduit and sized and shaped to engage the filter to be cleaned whereby the fluid under pressure is directed into an interior chamber of a filter upon actuating a control of the fluid thereby permitting flow of fluid under pressure from the tank into the filter to be cleaned and discharge of said fluid through the filter material in a direction opposite to the flow of air therethrough in normal operation of the filter.

1 Claim, 4 Drawing Figures

PATENTED MAY 30 1972 3,665,547
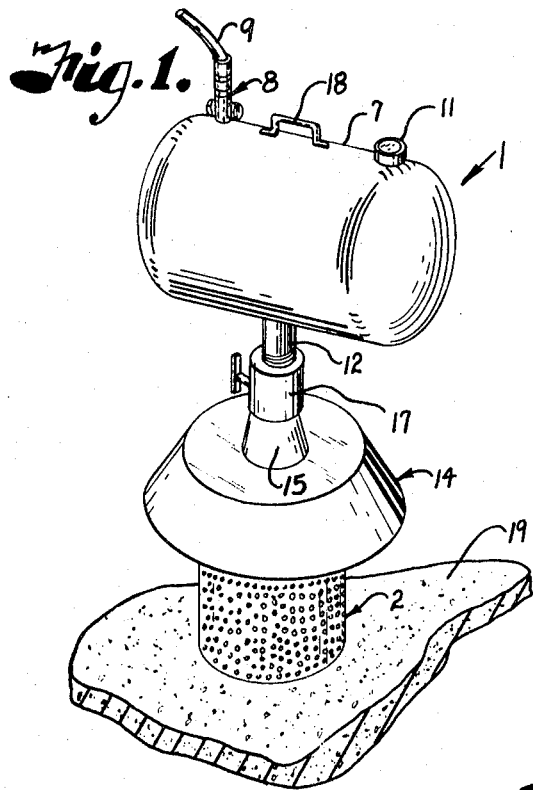
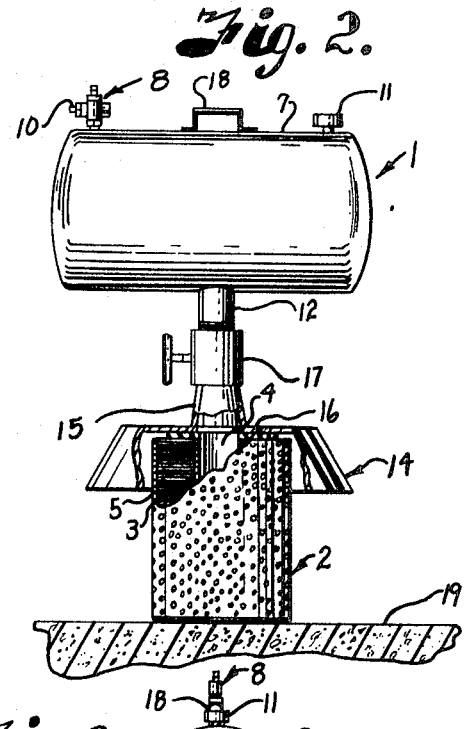
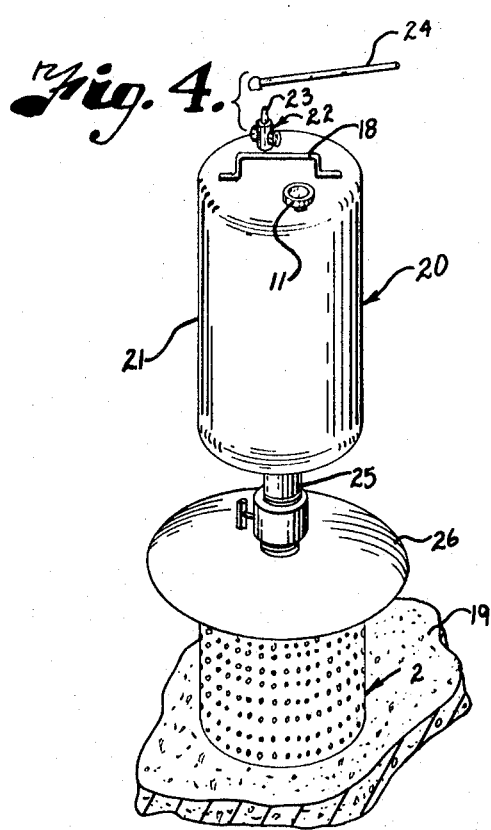
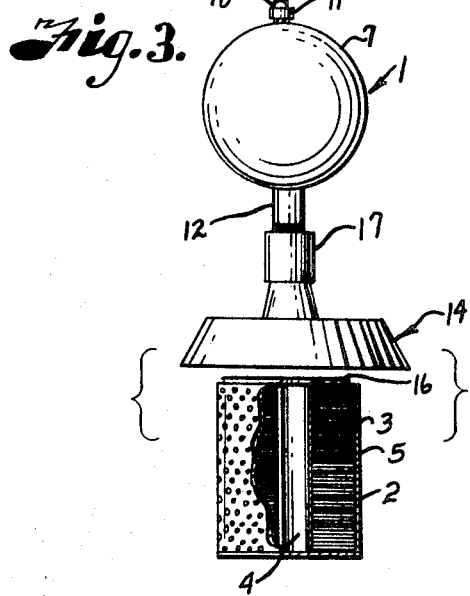
INVENTOR
John F. Boylan
BY
Fishburn, Gold & Litman
ATTORNEYS

FILTER CLEANING DEVICE

The present invention relates to filter cleaning devices and more particularly to a filter cleaning device adapted to effect a rapid pressure increase within an interior chamber of a filter to be cleaned and reverse flow therethrough.

The principal objects of the present invention are: to provide a filter cleaning device particularly adapted to clean filters having porous material, such as paper, fibers and like dust collecting media, such as used in air cleaners for engines and the like of vehicles, tractors or other air using equipment; to provide such a filter cleaning device operative to produce a controlled flow of fluid under pressure into an interior chamber of the filter to be cleaned; to provide such a filter cleaning device operative to effect a rapid pressure increase within an interior chamber of the filter to be cleaned and reverse flow therethrough; to provide such a filter cleaning device having means thereon for measuring the pressure within the tank and thereby the pressure to be released and directed into the filter; to provide such a filter cleaning apparatus with a fluid pressure discharge and portions contacting the filter whereby the fluid directed into the filter for reverse flow through the filter media and the operator is shielded from the cleaning flow of fluid; to provide such a filter cleaning device which is portable; and to provide such a filter cleaning device which is economical to manufacture, durable in construction, and particularly well adapted for the proposed use.

Other objects and advantages of this invention will become apparent from the following description taken in connection with the accompanying drawings wherein are set forth by way of illustration and example, certain embodiments of this invention.

FIG. 1 is a perspective view of a filter cleaning device embodying features of the present invention.

FIG. 2 is a side elevational view of the filter cleaning device in operative position relative to a filter to be cleaned with portions broken away to show the sealing engagement of the baffle and filter.

FIG. 3 is an end elevational view of the filter cleaning device.

FIG. 4 is a perspective view of a modified form of the filter cleaning device.

Referring more in detail to the drawings:

The reference numeral 1 generally designates a filter cleaning device for cleaning a filter 2 having a porous filter media 3, such as fibers, paper or the like, and used as an air cleaner for automotive vehicles, farm tractors, and the like. The vehicles, farm tractors, and the like travel through air having dirt and dust particles in suspension whereby the filter media 3 within the filter 2 becomes clogged with the dirt and dust particles thereby restricting the flow of air through the filter 2 which reduces the efficiency of the engine in the respective vehicle.

Filters are expensive and the filter media 3 is usually in good condition except for the dirt and dust particles therein whereby cleaning the filter media 3 is more economical than and preferable to replacement of the entire filter 2.

The filter 2 may be any type adapted to clean air flowing through a filter media which collects dirt and dust particles therein, such as a filter having the filter media 3 in the form of a tube having a chamber 4 therein with the filter media being enclosed within a cage 5 formed of a reticulated material, such as wire fabric, and having an opening 6 in one end thereof to receive a conduit for flow of the cleaned air to the point of use, such as in the engine of an automotive vehicle, farm tractor, and the like.

The filter cleaning device 1 is operative to effect a rapid flow of fluid under pressure through the filter media 3 in a direction opposite to the flow of air therethrough during normal use thereby cleaning the filter media 3 of the filter 2.

In the illustrated device, a pneumatic pressure tank 7 is adapted to contain a suitable gaseous fluid, such as air, under pressure therein. An air pressure inlet 8 is mounted on the tank 7 for introducing the fluid under pressure into the tank 7. It is preferable that the pressure inlet 8 be of the chuck type permitting a quick connection of a suitable air hose 9 communicating with a suitable source of fluid under pressure, such as an air compressor (not shown). The air pressure inlet 8 includes a valve 10 operative to control flow of fluid under pressure into the tank 7.

Filter sizes vary and the pressure required to effect a flow of fluid through the filter media 3 to clean same varies accordingly, therefore, pressure measuring means, in the form of a pressure gauge 11, is mounted on the tank 7 for visually displaying the amount of pressure therein.

An elongated flow conduit 12 communicates with the tank 7 and extends therefrom at a point spaced from the air pressure inlet 8 for communicating the source of fluid under pressure, in the form of the tank 7, with the opening 6 in the end of the cage 5 of the filter 2. A shield 14 is mounted on a free end of the flow conduit 12 and is sized and shaped to direct fluid under pressure into an interior chamber 4 of the filter 2 to be cleaned.

In the illustrated structure, the shield 14 is generally annular and concave and has a mounting portion 15 extending from the shield 14 and having a free end thereof suitably formed, as by being threaded, to be mounted on the free end of the flow conduit 12. The mounting portion 15 is illustrated as enlarging outwardly from the end of the flow conduit 12 toward the shield 14. It is preferable for the end of the mounting portion 15 at the shield 14 to have a size corresponding to the size of the opening 6 in one end of the filter 2 whereby fluid under pressure from the tank 7 and flow conduit 12 flows directly into the interior chamber 4 of the respective filter 2.

The shield 14 is shaped to sealingly engage the one end of the filter 2 having the opening 6 therein whereby all the fluid flowing through the conduit 12 flows into the chamber 4 within the filter media 3 and outwardly through the filter media to expel dirt and dust particles and the like from the filter media 3 thereby cleaning same. In the illustrated structure, the shield 14 is engageable with a gasket 16 on one end of the filter 2 thereby providing a seal between the filter 2 and the shield 14. The shield 14 also surrounds and extends outwardly of a portion of the filter 2 to prevent dust and the like from flowing toward an operator (not shown) of the filter cleaning device 1 thereby protecting the operator.

A valve member 17 is mounted in the flow conduit 12 to control the flow of fluid therethrough and the valve member 17 is preferably a quick opening valve of the ball type for permitting straight through flow from the tank 7 into the mounting portion 15 and shield 14 and directly into an interior chamber 4 of the filter 2 thereby effecting outwardly flow of the fluid through the filter media 3 of the filter 2.

A handle 18 is mounted on the pressure tank 7 preferably between the air pressure inlet 8 and the pressure gauge 11 and in a position on an opposite side of the tank 7 from the flow conduit 12 whereby the filter cleaning device 1 is portable.

In operating a filter cleaning device, constructed as described and illustrated, a desired amount of fluid is introduced into the tank to provide a predetermined pressure. In the illustrated device an air hose 9 is connected to the air pressure inlet 8 and the valve member 10 is operated to permit fluid under pressure to flow into the tank 7 and the valve 10 is again operated when the pressure gauge 11 discloses the desired pressure within the tank 7 corresponding with the selected filter 2 to be cleaned. The filter 2 is suitably positioned, as on a suitable support surface 19, such as a floor or the ground, and the shield 14 is positioned in covering relation with one end of the filter 2 and in engagement with the gasket 16 thereon to enclose the one end of the filter 2 having the opening 6 therein whereby the filter 2 is supported in a manner to close all openings communicating with the interior chamber 4 except the opening 6 and any flow of fluid from the filter cleaning device 1 and through the filter 2 must be through the filter media 3 in a direction reverse to the flow during normal use of the filter 2 thereby cleaning the filter media 3. The valve member 17 in the flow conduit 12 is then operated to effect a rapid flow of fluid through the interior chamber 4 of the filter 2 effecting a substantially uniform cleaning of the filter media thereof.

FIG. 4 illustrates a modified filter cleaning device 20 wherein a pressure tank 21 is generally vertically directed and includes an air pressure inlet 22 mounted thereon with the inlet 22 positioned adjacent one end of the tank 21 and having a valve stem 23 having a valve therein adapted to be depressed by an air hose 24 to effect flow of fluid under pressure into the tank 21. A flow conduit 25 extends from an end of the tank 21 opposite the end thereof having the inlet 22 and the handle 18 and gauge 11 mounted thereon. The flow conduit 25 has the valve member 17 mounted therein and a disc or concave shield 26 mounted on a free end of the flow conduit 25 and the shield 26 is engageable with the gasket 16 whereby the operation of the modified filter cleaning device 20 is substantially similar to operation of the filter cleaning device 1.

It is to be understood that while I have illustrated and described certain forms of my invention, it is not to be limited to these specific forms or arrangement of parts herein described and shown.

I claim:

1. A portable filter cleaning device for cleaning a filter adapted to clean air flowing through a filter media into a chamber therein and having at least one end with an opening to said chamber, said filter cleaning device comprising;
   a. a tank adapted to contain gaseous fluid under pressure;
   b. means on said tank for communication with a source of gaseous fluid under pressure for permitting filling of said tank to a pre-determined pressure;
   c. a conduit having an inlet connected to said tank in flow communication therewith, said conduit having an open outlet end;
   d. a valve in said conduit controlling flow therethrough, said valve and conduit being of sizes permitting rapid fluid flow therethrough when the valve is open;
   e. a shield fixed on said conduit adjacent the open outlet end thereof, said shield having a surface extending outwardly from said conduit for sealingly engaging said filter around the end opening thereof with said open outlet of the conduit communicating through said filter end opening with an interior chamber of said filter, said filter being held in place only by force applied to the shield by a user to effect said sealing engagement and hold the shield engaged with the filter open end and the other filter end engaged with a supporting surface;
   f. said shield being a concave member having an overhanging portion extending outwardly and curved downwardly beyond the filter whereby gaseous fluid under pressure directed from said conduit into the filter chamber passes outwardly through the filter media below said overhanging shield portion and downwardly and outwardly toward the supporting surface.

* * * * *